US012500051B2

(12) United States Patent
Zhang et al.

(10) Patent No.: US 12,500,051 B2
(45) Date of Patent: Dec. 16, 2025

(54) ENERGY STORAGE STATUS MONITORING STRUCTURE AND ROTARY SWITCH

(71) Applicants: Huawei Digital Power Technologies Co., Ltd., Shenzhen (CN); Shanghai Liangxin Electrical Co., Ltd., Shanghai (CN)

(72) Inventors: Xiufeng Zhang, Dongguan (CN); Jian Shi, Shanghai (CN); Hao Wang, Shanghai (CN); Shanbo Ren, Shanghai (CN); Xiaokang Tian, Shenzhen (CN)

(73) Assignees: Huawei Digital Power Technologies Co., Ltd., Shenzhen (CN); Shanghai Liangxin Electrical Co., Ltd., Shanghai (CN)

( * ) Notice: Subject to any disclaimer, the term of this patent is extended or adjusted under 35 U.S.C. 154(b) by 525 days.

(21) Appl. No.: 18/157,657

(22) Filed: Jan. 20, 2023

(65) Prior Publication Data

US 2023/0162930 A1 May 25, 2023

Related U.S. Application Data

(63) Continuation of application No. PCT/CN2021/100124, filed on Jun. 15, 2021.

(30) Foreign Application Priority Data

Jul. 20, 2020 (CN) ........................ 202010702832.3

(51) Int. Cl.
*H01H 19/14* (2006.01)
*H01H 19/36* (2006.01)

(52) U.S. Cl.
CPC ............ *H01H 19/14* (2013.01); *H01H 19/36* (2013.01); *H01H 2300/052* (2013.01)

(58) Field of Classification Search
CPC ...... H01H 19/14; H01H 19/11; H01H 19/585; H01H 19/58; H01H 19/62; H01H 19/635;
(Continued)

(56) References Cited

U.S. PATENT DOCUMENTS 4,481,492 A 11/1984 Borne et al.
12,027,327 B2 * 7/2024 Hong ..................... H01H 19/14
(Continued)

FOREIGN PATENT DOCUMENTS

CN 201117519 Y 9/2008
CN 106601518 A 4/2017
(Continued)

*Primary Examiner* — Ahmed M Saeed
(74) *Attorney, Agent, or Firm* — Leydig, Voit & Mayer, Ltd.

(57) ABSTRACT

An energy storage status monitoring structure and a rotary switch are provided and relate to the field of electrical technologies. The energy storage status monitoring structure includes an operation mechanism, an energy storage assembly, and a release assembly. The operation mechanism includes an upper cover, a rotating shaft rotatably connected to the upper cover, and an energy storage tray connected to the rotating shaft. The energy storage assembly is connected to the energy storage tray. A sensing portion is disposed on the energy storage tray. A sensing component is disposed on the release assembly. When the energy storage tray rotates to enable the energy storage assembly to store energy, the sensing portion corresponds to the sensing component, so that the sensing component outputs a corresponding sensing signal.

18 Claims, 12 Drawing Sheets

(58) Field of Classification Search
CPC ...... H01H 19/64; H01H 19/63; H01H 19/005; H01H 19/10; H01H 1/2041; H01H 19/56; H01H 19/03; H01H 19/02; H01H 2019/006; H01H 19/00; H01H 19/20; H01H 19/001; H01H 21/50; H01H 2221/01
See application file for complete search history.

(56) References Cited

U.S. PATENT DOCUMENTS

| | | | | |
|---|---|---|---|---|
| 2019/0180961 | A1* | 6/2019 | Miyaoka | H01H 11/0018 |
| 2021/0265120 | A1* | 8/2021 | Marcotte | H01H 19/08 |
| 2021/0286396 | A1* | 9/2021 | Izumi | G05G 1/10 |

FOREIGN PATENT DOCUMENTS

| | | | |
|---|---|---|---|
| CN | 108878224 | A | 11/2018 |
| CN | 108962645 | A | 12/2018 |
| CN | 110911187 | A | 3/2020 |
| CN | 111863496 | A | 10/2020 |
| CN | 212365820 | U | 1/2021 |
| EP | 3413328 | A1 | 12/2018 |

* cited by examiner

ENERGY STORAGE STATUS MONITORING STRUCTURE AND ROTARY SWITCH

CROSS-REFERENCE TO RELATED APPLICATIONS

This application is a continuation of International Application No. PCT/CN2021/100124, filed on Jun. 15, 2021, which claims priority to Chinese Patent Application No. 202010702832.3, filed on Jul. 20, 2020. The disclosures of the aforementioned applications are hereby incorporated by reference in their entireties.

TECHNICAL FIELD

The present disclosure relates to the field of electrical technologies, and in particular, to an energy storage status monitoring structure and a rotary switch.

BACKGROUND

A switch refers to an element that enables a circuit to be opened, enables a current to be interrupted, or enables a current to flow to another circuit. In the history of switches, a switch evolved from an original knife switch that requires a manual operation to a current intelligent switch that is used in various large electrical control devices. The switch has more functions and higher safety.

With development of technologies, switches are widely used in increasing control fields or automation fields, such as fields of electric power, machinery, mines, metallurgy, petrochemical, architecture, shipping, nuclear power, and new energy power generation. During use, a power supply often needs to be cut off in an emergency. In a relatively quick power supply cut-off mode, an energy storage assembly cooperates with a release assembly, and the energy storage assembly releases energy to drive a switch to perform a switch-off operation.

However, the energy storage assembly may have not completed energy storage when a power supply needs to be remotely cut off. Consequently, during remote control, the energy storage assembly cannot be remotely controlled to release energy to drive the switch to perform the switch-off operation, affecting a normal remote operation.

SUMMARY

The present disclosureprovides an energy storage status monitoring structure and a rotary switch, to monitor an energy storage status of an energy storage assembly, thereby improving reliability of remote control.

Embodiments of the present disclosure are implemented as follows:

According to an aspect of embodiments of the present disclosure, an energy storage status monitoring structure is provided, including an operation mechanism, an energy storage assembly, and a release assembly. The operation mechanism includes an upper cover, a rotating shaft rotatably connected to the upper cover, and an energy storage tray connected to the rotating shaft. The energy storage assembly is connected to the energy storage tray. A sensing portion is disposed on the energy storage tray. A sensing component is disposed on the release assembly. When the energy storage tray rotates to enable the energy storage assembly to store energy, the sensing portion corresponds to the sensing component, so that the sensing component outputs a corresponding sensing signal.

Optionally, the sensing component is any one of a micro switch, a travel switch, or a proximity switch.

Optionally, the energy storage assembly includes a lock, and an energy storage spring clamped to the energy storage tray and the upper cover. Rotating the energy storage tray enables the energy storage spring to store energy and be clamped to the lock.

Optionally, the energy storage tray further includes a first protrusion. The energy storage spring includes an energy storage body, and a first torsion arm and a second torsion arm that are connected to the energy storage body. The first torsion arm is clamped to the upper cover, and the second torsion arm abuts against the first protrusion.

Optionally, the release assembly further includes a release, and the lock includes a hinge portion hinged to the upper cover, a limiting portion configured to limit the second torsion arm, and a release portion cooperating with the release.

Optionally, a first elastic member is further disposed on the lock, and the operation mechanism further includes a mounting base connected to the upper cover. The first elastic member is disposed between the lock and the upper cover, or the first elastic member is disposed between the lock and the mounting base, so that the release portion has a tendency to move toward the release.

Optionally, a mounting groove is disposed in the mounting base, and a turntable is disposed in the mounting groove. The turntable is configured to connect the energy storage tray to an on/off assembly of the rotary switch, so that the energy storage tray controls, by using the turntable, switch-off or switch-on of the rotary switch.

Optionally, the energy storage tray further includes a second protrusion. The turntable includes a stopper. The stopper is located in a storage slot of the turntable. A second elastic member is disposed in the storage slot, and the second elastic member abuts against each of the second protrusion and the stopper. When rotating, the energy storage tray drives, by using the second elastic member, the turntable to rotate, to enable the rotary switch to be switched off or switched on.

Optionally, the release assembly further includes a housing and a reset button disposed on the housing. The reset button includes a pressing portion and a support portion connected to the pressing portion. A clamping portion is disposed on the support portion, and is configured to be clamped to a blocker in the housing for limiting. The support portion is configured to abut against the release, so that the release is reset after acting.

Optionally, an elastic reset member is disposed between the pressing portion and the housing, so that the reset button has a tendency to move toward the release.

According to another aspect of embodiments of the present disclosure, a rotary switch is provided, including the energy storage status monitoring structure according to any one of the foregoing implementations, and the on/off assembly connected to the operation mechanism in the energy storage status monitoring structure. The on/off assembly includes a static contact component and a dynamic contact component that is connected to the energy storage tray of the operation mechanism through transmission.

Beneficial effects of embodiments of the present disclosure include:

According to the status monitoring structure and the rotary switch provided in embodiments of the present disclosure, by using the upper cover of the operation mechanism, the rotating shaft rotatably connected to the upper cover, and the energy storage tray connected to the rotating shaft, the energy storage assembly is enabled to accumulate elastic potential energy during rotation of the energy storage tray, because the energy storage assembly is connected to the energy storage tray. When accumulation of the elastic potential energy is completed, the sensing portion of the energy storage tray corresponds to the sensing component, so that the sensing component outputs the corresponding sensing signal, to ensure that the energy storage spring completes energy storage. Therefore, during remote control, the energy storage spring can be remotely controlled to release energy to drive the switch to perform a switch-off operation, thereby improving reliability of remote control.

BRIEF DESCRIPTION OF DRAWINGS

To describe the technical solutions in embodiments of the present disclosure more clearly, the following briefly describes the accompanying drawings for describing embodiments. It should be understood that, the following accompanying drawings show merely some embodiments of the present disclosure, and therefore should not be regarded as a limitation on the scope. A person of ordinary skill in the art can still derive other related drawings from these accompanying drawings without creative efforts.

Figure 1:
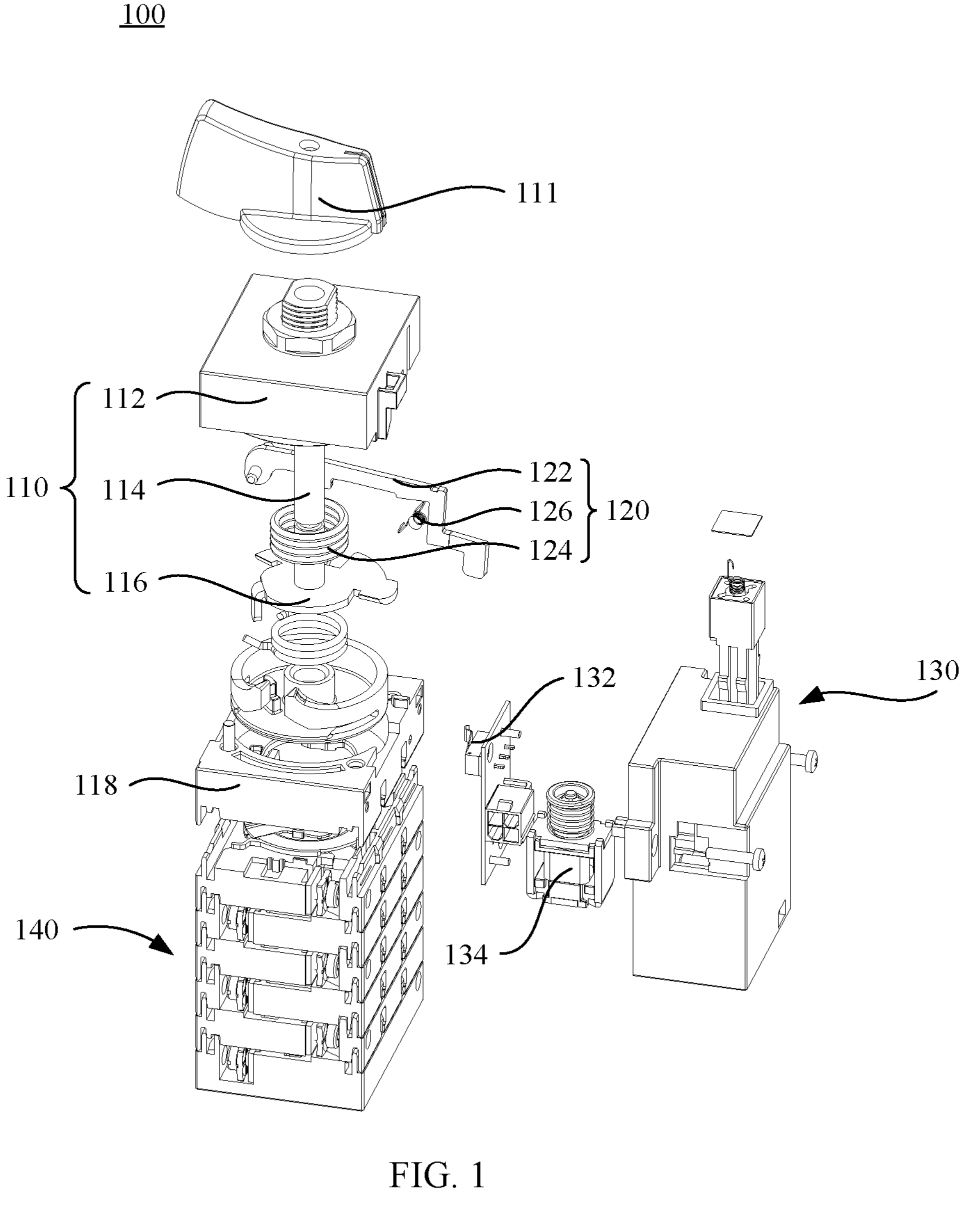
FIG. 1 is a schematic diagram of a structure of a rotary switch according to an embodiment of the present disclosure.

Reference numerals: 100—rotary switch; 110—operation mechanism; 111—knob; 112—upper cover; 1122—limiting groove; 1124—hollow pillar; 1125—hinged support; 1126—first limiting protrusion; 1128—second limiting protrusion; 114—rotating shaft; 1142—ring groove; 116—energy storage tray; 1162—sensing portion; 1164—first protrusion; 1166—second protrusion; 1168—pushing portion; 117—second elastic member; 1172—elastic body; 1174—first end; 1176—second end; 118—mounting base; 1182—mounting groove; 119—turntable; 1191—turntable body; 1192—stopper; 1193—connecting hole; 1194—first pawl; 1196—second pawl; 1197—preset space; 1198—first gap; 1199—second gap; 120—energy storage assembly; 122—lock; 1221—hinge portion; 1222—limiting portion; 1223—release portion; 1224—guide surface; 1225—limiting surface; 1226—limiting protrusion; 1227—support body; 1228—folding edge; 1229—forced portion; 124—energy storage spring; 1242—energy storage body; 1244—first torsion arm; 1246—second torsion arm; 126—first elastic member; 130—release assembly; 132—sensing component; 134—release; 136—housing; 1362—blocker; 138—reset button; 1382—pressing portion; 1384—support portion; 1386—clamping portion; 139—elastic reset member; 140—on/off assembly; 142—dynamic contact component; 144—static contact component; and 146—coupler.

DESCRIPTION OF EMBODIMENTS

To make the objectives, technical solutions, and advantages of embodiments of the present disclosure clearer, the following clearly describes the technical solutions in embodiments of the present disclosure with reference to the accompanying drawings in embodiments of the present disclosure. It is clear that the described embodiments are some but not all of embodiments of the present disclosure. Generally, components of embodiments of the present disclosure described and shown in the accompanying drawings may be arranged and designed in various manners.

Therefore, the following detailed description of embodiments of the present disclosure in the accompanying drawings is not intended to limit the protection scope of the present disclosure, but merely represent selected embodiments of the present disclosure. Other embodiments obtained by a person of ordinary skill in the art based on embodiments of the present disclosure without creative efforts shall fall within the protection scope of the present disclosure.

It should be noted that similar reference signs and letters represent similar items in the accompanying drawings below. Therefore, once an item is defined in one drawing, it does not need to be further defined and described in subsequent drawings. In addition, the terms such as "first" and "second" are used only for distinguishing descriptions and cannot be understood as an indication or implication of relative importance.

In the description of the present disclosure, it should be further noted that, unless otherwise specified and defined explicitly, the terms "arrangement" and "connection" should be understood broadly. For example, a connection may be a fixed connection, a removable connection, or an integral connection; may be a mechanical connection or an electrical connection; may be a direct connection or an indirect connection via a medium; or may be an internal connection between two components. A person of ordinary skill in the art can understand specific meanings of the foregoing terms in the present disclosure based on a specific situation.

A status monitoring structure provided in an embodiment is mainly applied to a rotary switch, to improve reliability of remote control by monitoring an energy storage status of an energy storage assembly in the rotary switch. In this embodiment, the rotary switch is used as an example for detailed description.

As shown in FIG. 1, a rotary switch 100 in this embodiment includes an energy storage status monitoring structure. The energy storage status monitoring structure includes an operation mechanism 110, an energy storage assembly 120, and a release assembly 130. The operation mechanism 110 includes an upper cover 112, a rotating shaft 114 rotatably connected to the upper cover 112, and an energy storage tray 116 connected to the rotating shaft 114. The energy storage assembly 120 is connected to the energy storage tray 116. A sensing portion 1162 is disposed on the energy storage tray 116. A sensing component 132 is disposed on the release assembly 130. When the energy storage tray 116 rotates to enable the energy storage assembly 120 to store energy, the sensing portion 1162 corresponds to the sensing component 132, so that the sensing component 132 outputs a corresponding sensing signal.

Figure 2:
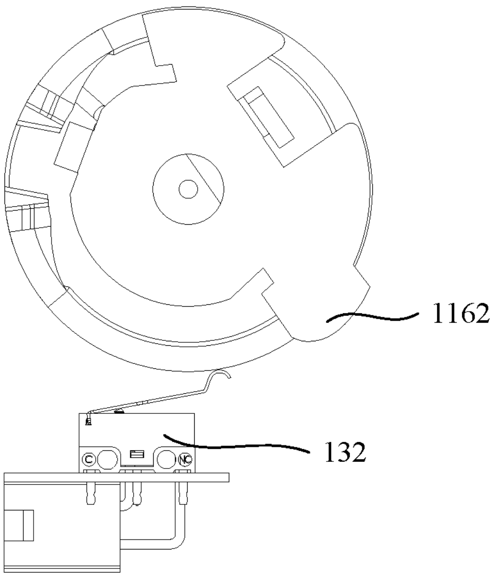
FIG. 2 is a first diagram of a locational relationship between a sensing portion and a sensing component according to an embodiment of the present disclosure.
Figure 3:
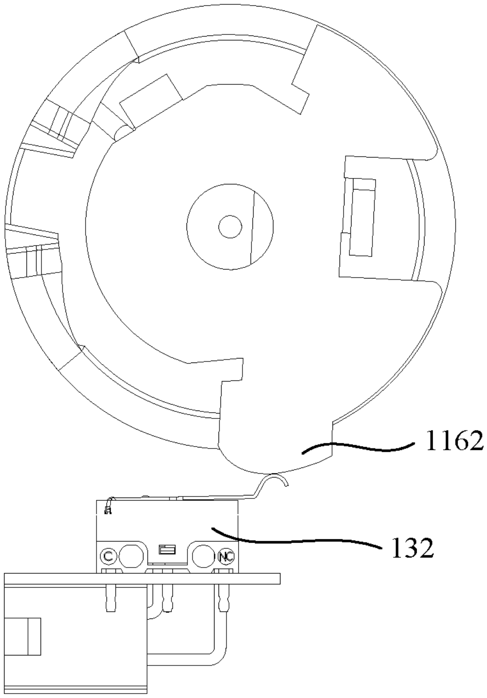
FIG. 3 is a second diagram of a locational relationship between a sensing portion and a sensing component according to an embodiment of the present disclosure.

For example, when the sensing portion 1162 is located in different locations, the sensing component 132 outputs different signals. As shown in FIG. 2, when the sensing portion 1162 deviates from a location corresponding to the sensing component 132, the sensing portion 1162 cannot trigger the sensing component 132 to have a signal change, and the sensing component 132 outputs a first signal. As shown in FIG. 3, when the sensing portion 1162 corresponds to the sensing component 132, the sensing portion 1162 triggers the sensing component 132 to act, so that the sensing component 132 outputs a second signal. Because the first signal is different from the second signal, when the second signal is received, it is considered that the energy storage tray 116 drives an energy storage spring 124 to complete energy storage, and the energy storage spring 124 is clamped to a lock 122, thereby providing a guarantee for subsequent remote control of switch-off.

It should be noted that a form of a connection between the rotating shaft 114 and the energy storage tray 116 is not specifically limited in this embodiment, provided that a required transmission requirement and a stable connection can be met. For example, the rotating shaft 114 and the energy storage tray 116 may use a form of a fixed connection, such as riveting, welding, or integral molding, or may use a form of an assembly connection, such as a sleeved connection, a clamped connection, or a screwed connection.

According to the status monitoring structure provided in this embodiment of the present disclosure, by using the upper cover 112 of the operation mechanism 110, the rotating shaft 114 rotatably connected to the upper cover 112, and the energy storage tray 116 connected to the rotating shaft 114, the energy storage assembly 120 is enabled to accumulate elastic potential energy during rotation of the energy storage tray 116, because the energy storage assembly 120 is connected to the energy storage tray 116. When accumulation of the elastic potential energy is completed, the sensing portion 1162 of the energy storage tray 116 corresponds to the sensing component 132, so that the sensing component 132 outputs a corresponding sensing signal, to ensure that the energy storage spring 124 completes energy storage. Therefore, during remote control, the energy storage spring 124 can be remotely controlled to release energy to drive the switch to perform a switch-off operation, thereby improving reliability of remote control.

The sensing component 132 in this embodiment may be any one of a micro switch, a travel switch, or a proximity switch, provided that output of a required sensing signal can be ensured. In actual application, the sensing component 132 can be flexibly selected based on an actual disposing location and a size of space.

As shown in FIG. 1, the energy storage assembly 120 includes the lock 122 hinged to the upper cover 112, and the energy storage spring 124 clamped to each of the energy storage tray 116 and the upper cover 112. Rotating the energy storage tray 116 enables the energy storage spring 124 to store energy and be clamped to the lock 122.

Specifically, a disposing location of the energy storage spring 124 is not specifically limited in this embodiment of this application. For example, the energy storage spring 124 may be sleeved on the rotating shaft 114, or may be disposed in an accommodation space of the upper cover 112, as long as it can be ensured that one end of the energy storage spring 124 is clamped to the upper cover 112, and the other end thereof is clamped to the energy storage tray 116, to provide required elastic potential energy by using the energy storage spring 124.

When relative rotation occurs between the rotating shaft 114 and the upper cover 112 by using the energy storage spring 124 clamped to each of the energy storage tray 116 and the upper cover 112, the energy storage tray 116 synchronously rotates with the rotating shaft 114, to drive the energy storage spring 124 to be elastically deformed, so that the energy storage spring 124 accumulates elastic potential energy. The lock 122 is hinged to the upper cover 112, so that the lock 122 can rotate along a hinge part. In addition, during a rotation process of the energy storage tray 116, when the energy storage spring 124 is driven to be elastically deformed, the energy storage spring 124 is clamped to the lock 122, thereby maintaining the elastic potential energy accumulated by the energy storage spring 124. When the energy storage spring 124 stores energy and is clamped to the lock 122, the sensing portion 1162 of the energy storage tray 116 corresponds to the sensing component 132, so that the sensing component 132 outputs the corresponding sensing signal, to ensure that the energy storage spring 124 completes energy storage.

Figure 4:
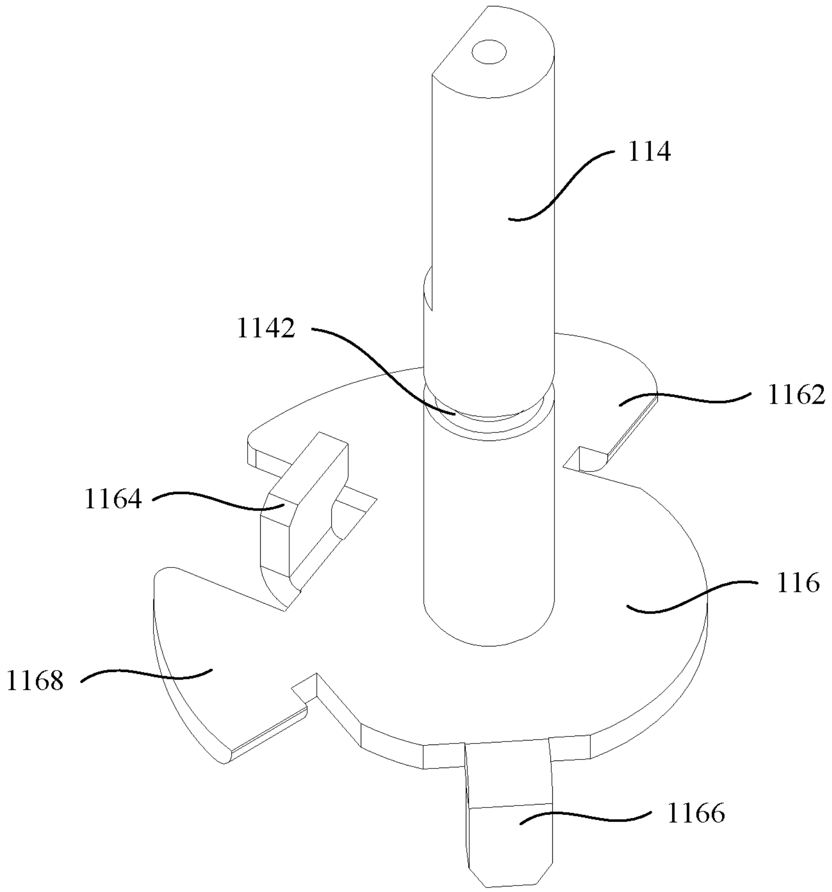
FIG. 4 is a schematic diagram of a structure of a connection between a rotating shaft and an energy storage tray according to an embodiment of the present disclosure.
Figure 5:
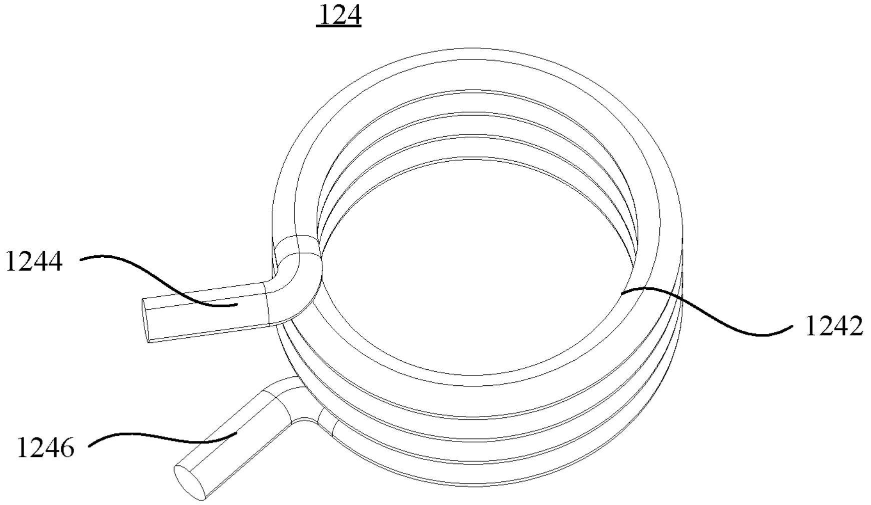
FIG. 5 is a schematic diagram of a structure of an energy storage spring according to an embodiment of the present disclosure.

As shown in FIG. 4 and FIG. 5, the energy storage tray 116 further includes a first protrusion 1164. The energy storage spring 124 includes an energy storage body 1242, and a first torsion arm 1244 and a second torsion arm 1246 that are connected to the energy storage body 1242. The first torsion arm 1244 is clamped to the upper cover 112, and the second torsion arm 1246 abuts against the first protrusion 1164.

Figure 6:
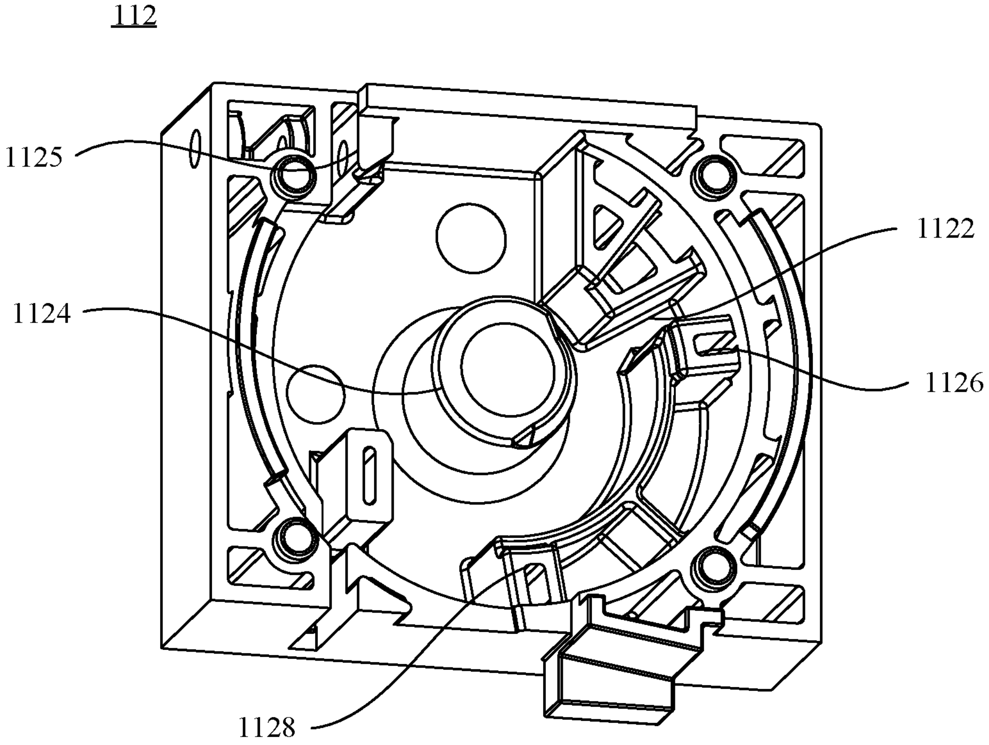
FIG. 6 is a schematic diagram of a structure of an upper cover according to an embodiment of the present disclosure.

For example, still referring to FIG. 6, a limiting groove 1122 is disposed on the upper cover 112, and the first torsion arm 1244 of the energy storage spring 124 is clamped to the upper cover 112 through the limiting groove 1122. In this way, a location between the first torsion arm 1244 of the energy storage spring 124 and the upper cover 112 may be relatively fixed, which helps improve stability of the energy storage spring 124 during use, and ensures that the energy storage spring 124 can store energy normally. In addition, by using the second torsion arm 1246 and the first protrusion 1164 of the energy storage tray 116 in a process of recovery from elastic deformation, the energy storage tray 116 is driven to rotate, which helps improve stability during switch-off.

Still referring to FIG. 6, a hollow pillar 1124 is further disposed on the upper cover 112. The rotating shaft 114 passes through the hollow pillar 1124, and is rotatably connected to the upper cover 112. Specifically, the rotating shaft 114 is connected to an inner side and an outer side of the upper cover 112, to perform an interactive operation with the rotary switch 100 by using the rotating shaft 114. The rotating shaft 114 is disposed by passing through the hollow pillar 1124, so that smoothness of rotation of the rotating shaft 114 can be improved, and the rotating shaft 114 is prevented from shaking in a radial direction, thereby improving precision and stability during rotatable connection. In addition, the energy storage body 1242 may be sleeved on an outer circle of the hollow pillar 1124. This can limit the energy storage spring 124, to prevent a lateral deviation of the energy storage spring 124 and impact on clamping between the first torsion arm 1244 of the energy storage spring 124 and the upper cover 112. In addition, it can also be ensured that the second torsion arm 1246 of the energy storage spring 124 is clamped to and abuts against the first protrusion 1164 of the energy storage tray 116, to avoid misalignment and impact on energy storage of the energy storage spring 124. In addition, this also enables the second torsion arm 1246 of the energy storage spring 124 to better cooperate with the lock 122, to avoid accidental separation of the second torsion arm 1246 from the lock 122 that is caused by shaking of the energy storage spring 124 and avoid affecting energy storage of the energy storage spring 124.

In the foregoing disposing form, not only stability of the energy storage spring 124 during use can be ensured, but also cooperation between the energy storage spring 124, the upper cover 112, and the rotating shaft 114 can be more compact to fully utilize an internal space. This helps implement miniaturization of the rotary switch 100.

As shown in FIG. 1, FIG. 4, and FIG. 6, a ring groove 1142 is disposed on the rotating shaft 114. A sealing ring is disposed on an outer circle of the ring groove 1142, so that locations of the sealing ring and the rotating shaft 114 are relatively fixed. The sealing ring is located between the rotating shaft 114 and the hollow pillar 1124 of the upper cover 112. When the rotating shaft 114 passes through the upper cover 112 and is rotatably connected to the upper cover 112, the sealing ring can play a sealing function to enhance sealing performance of the rotary switch 100. A knob 111 is further disposed on the rotating shaft 114, and the knob 111 is located at an end of the rotating shaft 114 that is away from a transmission member. In addition, the knob 111 is further disposed on the rotating shaft 114, and the knob 111 is located at the end of the rotating shaft 114 that is away from the transmission member. With the knob 111 disposed on the rotating shaft 114, manually operating the rotary switch 100 is more labor-saving and more convenient.

Figure 7:
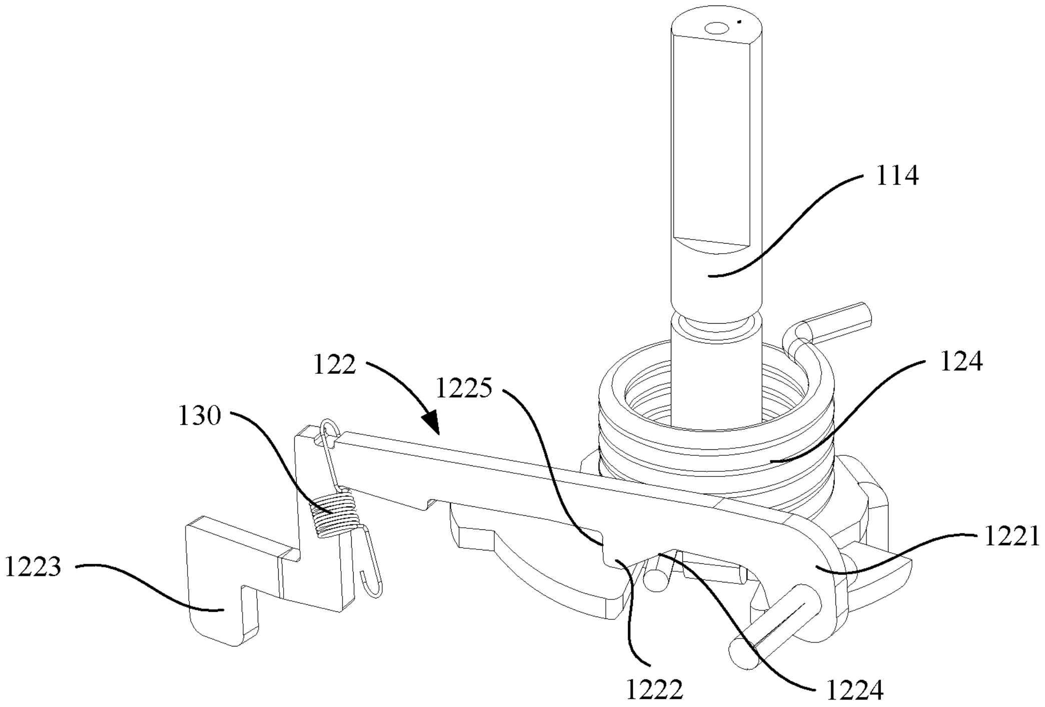
FIG. 7 is a first schematic diagram of a structure of a connection between an operation mechanism and an energy storage assembly according to an embodiment of the present disclosure.

As shown in FIG. 1 and FIG. 7, the release assembly 130 further includes a release 134, and the lock 122 includes a hinge portion 1221 hinged to the upper cover 112, a limiting portion 1222 configured to limit the second torsion arm 1246, and a release portion 1223 cooperating with the release 134.

For example, the release 134 is any one of a magnetic flux converter, a separate release, an undervoltage release, or an overvoltage release. An action of the release 134 is controlled by using an electrical signal, so that the lock 122 releases limitation on the energy storage spring 124, and the rotary switch 100 is enabled to rapidly respond, to implement a remote switch-off function.

Still referring to FIG. 6, further, a hinged support 1125 is correspondingly disposed on the upper cover 112, and the hinge portion 1221 of the lock 122 is connected to the hinged support 1125. Referring to FIG. 4 and FIG. 7, when the rotating shaft 114 enables the energy storage tray 116 to synchronously rotate with the rotating shaft 114, the first protrusion 1164 of the energy storage tray 116 pushes the second torsion arm 1246 of the energy storage spring 124 to move along with the energy storage tray 116. In addition, the first torsion arm 1244 of the energy storage spring 124 is clamped to the upper cover 112, so that the energy storage spring 124 is elastically deformed during movement of the energy storage tray 116, thereby generating elastic potential energy. In a process in which the first protrusion 1164 of the energy storage tray 116 pushes the second torsion arm 1246 of the energy storage spring 124 to move along with the energy storage tray 116, the second torsion arm 1246 of the energy storage spring 124 is clamped to the limiting portion 1222, so that the elastic potential energy generated by the energy storage spring 124 is maintained. When the energy storage spring 124 is limited, the rotating shaft 114 can rotate back and forth, so that the rotary switch 100 is switched off or switched on. In addition, when the energy storage spring 124 is limited by the lock 122 to store energy, and the rotating shaft 114 is rotated to switch on the rotary switch 100, there is no need to drive the energy storage spring 124 to be elastically deformed, and switch-on is more labor-saving.

The release 134 is configured to receive a control signal, and acts based on the control signal, for example, apply an acting force to the release portion, so that the release portion 1223 moves away from a location of the release 134. In a process in which the release portion 1223 moves away from the release 134, relative rotation occurs between the hinge portion 1221 of the lock 122 and the upper cover 112, so that a location of the limiting portion 1222 of the lock 122 moves, the second torsion arm 1246 of the energy storage spring 124 is no longer limited, and the energy storage spring 124 can recover from elastic deformation and drive the energy storage tray 116 to rotate reversely, to enable the energy storage tray 116 to rotate to a switch-off location, thereby completing a switch-off operation.

Figure 8:
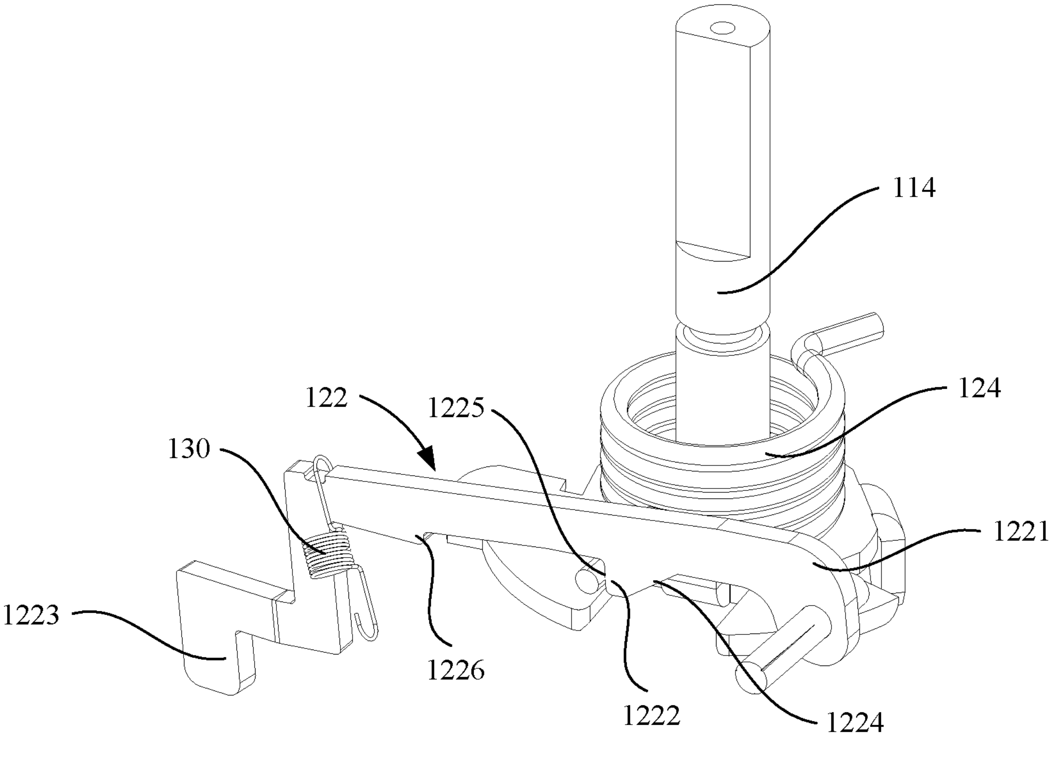
FIG. 8 is a second schematic diagram of a structure of a connection between an operation mechanism and an energy storage assembly according to an embodiment of the present disclosure.

As shown in FIG. 1, FIG. 7, and FIG. 8, a first elastic member 126 is further disposed on the lock 122, and the operation mechanism 110 further includes a mounting base 118 connected to the upper cover 112. The first elastic member 126 is disposed between the lock 122 and the upper cover 112, or the first elastic member 126 is disposed between the lock 122 and the mounting base 118, so that the release portion 1223 has a tendency to move toward the release 134.

For example, when the first elastic member 126 is disposed between the lock 122 and the upper cover 112, the first elastic member 126 may be in a form of a compression spring, a spring plate, or the like, so that there is a repulsion force between the lock 122 and the upper cover 112, and the release portion 1223 has the tendency to move toward the release 134. When the first elastic member 126 is disposed between the lock 122 and the mounting base 118, the first elastic member 126 may be in a form of an extension spring, an elastic rope, or the like, so that the release portion 1223 has the tendency to move toward the release 134, and it is ensured that the limiting portion 1222 can stably limit the second torsion arm 1246 of the energy storage spring 124.

In addition, still referring to FIG. 8, a limiting protrusion 1226 is disposed between the release portion 1223 and the limiting portion 1222, and the limiting protrusion 1226 cooperates with the mounting base 118 to limit the lock 122. For example, when the release 134 is restored to a state existing before the action, the lock 122 is under an action of the first elastic member 126, so that the lock 122 rotates by using the hinge portion 1221, and the release portion 1223 has the tendency to move toward the release 134. By using the limiting protrusion 1226 disposed between the release portion 1223 and the limiting portion 1222, the mounting base 118 limits a movement range of the lock 122 in a process in which the release portion 1223 moves toward the release 134, to avoid a collision between the release portion 1223 and the release 134, thereby improving stability of the release 134 during use.

Figure 12:
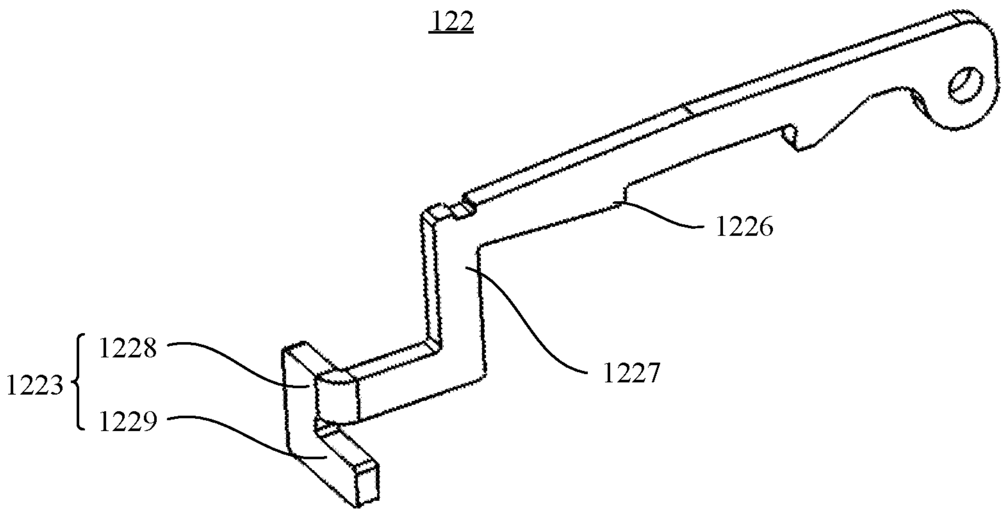
FIG. 12 is a schematic diagram of a structure of a lock according to an embodiment of the present disclosure.

Referring to FIG. 12, the lock 122 includes a support body 1227, and the release portion 1223 includes a folding edge 1228 connected to the support body 1227 and a forced portion 12299 connected to the folding edge 1228. Specifically, there is a preset included angle between a plane on which the folding edge 1228 is located and a plane on which the support body 1227 is located, and the included angle is preferably 90°. In this way, connection strength between the support body 1227 and the release portion 1223 can be improved, to avoid deformation of the lock 122 caused by a force, and improve structural stability of the lock 122.

As shown in FIG. 7 and FIG. 8, a guide surface 1224 is disposed between the hinge portion 1221 and the limiting portion 1222, a limiting surface 1225 is disposed on a side of the limiting portion 1222 that is away from the guide surface 1224, and the limiting surface 1225 has an angle of inclination. The angle of inclination may be properly set based on a location of the hinge portion 1221 of the lock 122. For example, when the rotating shaft 114 drives the energy storage tray 116 to rotate, the first protrusion 1164 on the energy storage tray 116 drives the second torsion arm 1246 to rotate with the energy storage tray 116. When the second torsion arm 1246 moves, the second torsion arm 1246 abuts against the guide surface 1224, and moves along the guide surface 1224 toward the location of the limiting portion 1222. When the second torsion arm 1246 moves to the side of the limiting portion 1222 that is away from the guide surface 1224, that is, when the second torsion arm 1246 moves to the side of the limiting portion 1222 on which the limiting surface 1225 is disposed, the second torsion arm 1246 is limited by the limiting portion 1222. Even if the energy storage tray 116 no longer applies an acting force to the second torsion arm 1246, the second torsion arm 1246 cannot be restored to an initial state, thereby implementing an energy storage operation on the energy storage spring 124.

When the release 134 receives a release signal, the release 134 acts, so that the release portion 1223 overcomes an acting force of the first elastic member 126 and moves away from the location of the release 134. In a movement process of the release portion 1223, a limiting amount of the limiting surface 1225 on the second torsion arm 1246 of the energy storage spring 124 gradually decreases, until the second torsion arm 1246 is relieved from the limiting action of the limiting portion 1222. After the second torsion arm 1246 is relieved from the action of the limiting portion 1222 of the lock 122, the elastic potential energy accumulated by the energy storage spring 124 is released. By using the first protrusion 1164, the energy storage tray 116 is driven to rotate to the switch-off location, so that the rotary switch 100 is switched off.

Figure 9:
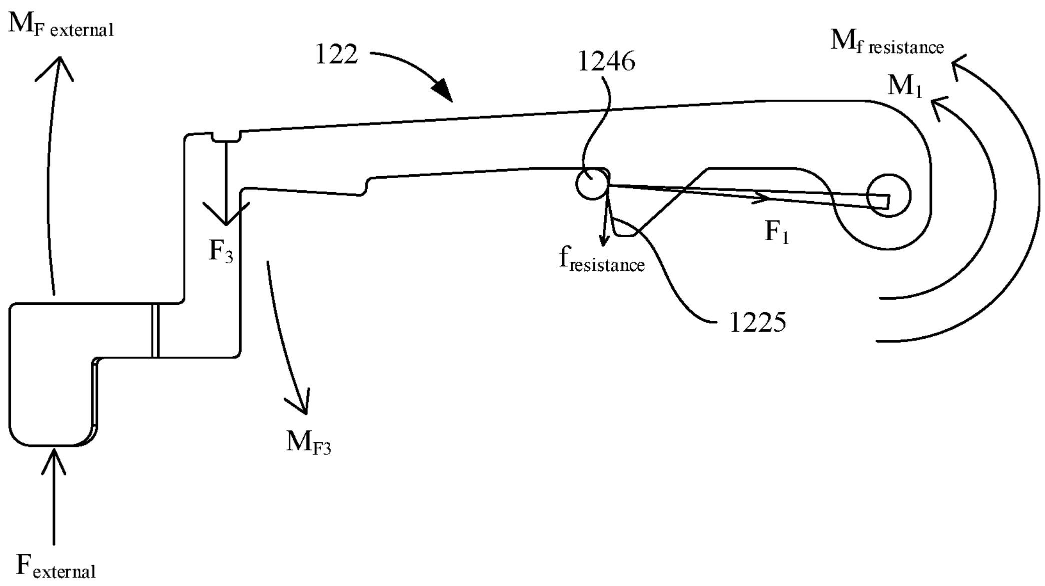
FIG. 9 is a first schematic diagram of forces on a lock according to an embodiment of the present disclosure.

As shown in FIG. 9, when the second torsion arm 1246 abuts against the limiting surface 1225 with the angle of inclination, the second torsion arm 1246 applies an acting force $F_1$ to the limiting surface 1225 at an abutment location, and an extending direction of the acting force $F_1$ needs to be located below a connecting line between the abutment location and a hinge location (as shown in FIG. 9). In this case, the acting force $F_1$ generates a counterclockwise moment $M_1$ on the lock 122, so that the lock 122 generates a counterclockwise rotation tendency, thereby strengthening limitation of the limiting surface 1225 on the second torsion arm 1246, and implementing more stable locking. In this way, the energy storage assembly 120 can still stably maintain an energy storage state under vibration of a specific amplitude.

Figure 10:
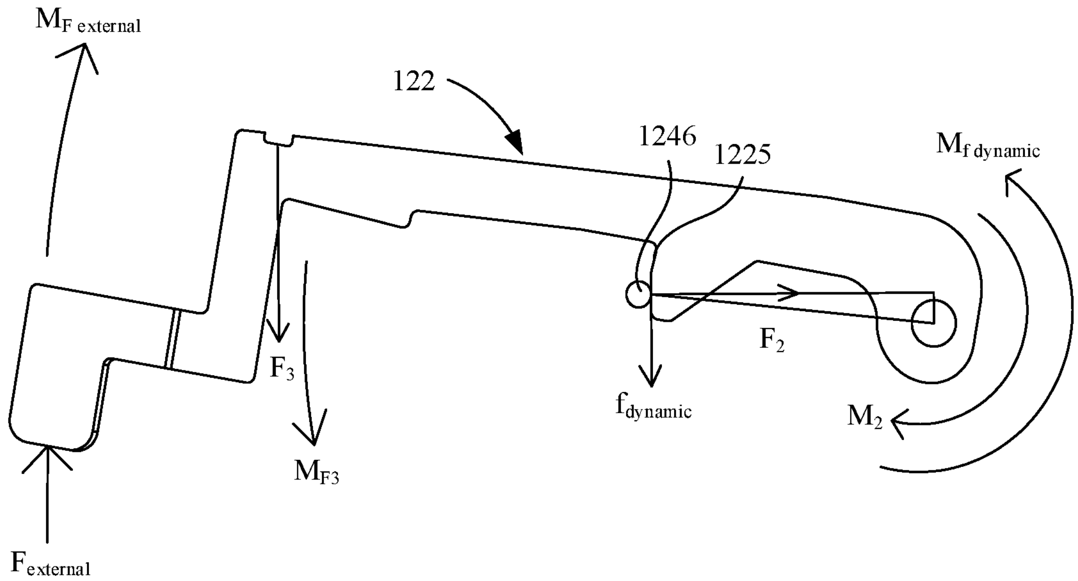
FIG. 10 is a second schematic diagram of forces on a lock according to an embodiment of the present disclosure.

When the second torsion arm 1246 needs to be separated from the limiting portion 1222 to implement energy release of the energy storage spring 124, an external force may be applied to the release portion 1223 of the lock 122, thereby driving the lock 122 to rotate in a direction away from the second torsion arm 1246. The limiting surface 1225 includes a barrier surface and a transition surface that are connected to each other. As shown in FIG. 10, the lock 122 rotates clockwise under an action of an external force (which may be provided by the release 134). In this case, the second torsion arm 1246 gradually switches from the energy storage state to an energy release state. In a switching process, the second torsion arm 1246 slides (relatively moves) from a wall surface that abuts against the barrier surface to the transition surface below the barrier surface. In this case, because the second torsion arm 1246 still stores energy, the second torsion arm 1246 further applies an acting force to the transition surface. Because one end of the lock 122 is hinged to the upper cover 112, when the acting force acts on the lock 122 (the limiting portion 1222), the lock 122 is enabled to generate a tendency to rotate along the hinge portion 1221. In addition, the rotation tendency is to rotate in a direction away from the second torsion arm 1246, to facilitate separation between the limiting portion 1222 and the second torsion arm 1246, so that the energy storage spring 124 can release energy smoothly. In particular, the release 134 is used to apply an external force to the lock 122 to drive the lock 122 to rotate, so that the limiting portion 1222 and the second torsion arm 1246 are separated, thereby implementing energy release of the energy storage spring 124. A reason is that, due to a structural limitation of the release 134, a striking force of the release 134 gradually weakens as a distance by which a protruding end of the release 134 extends outward increases. Disposing the transition surface can effectively avoid a phenomenon that the energy storage spring 124 cannot release energy when separation is needed because the striking force of the release 134 weakens in a later stage and consequently the second torsion arm 1246 and the limiting portion 1222 cannot be completely separated. This effectively ensures that energy release can be smoothly and accurately performed when the energy storage spring 124 needs to release energy, and improves control reliability of the rotary switch 100 in this application.

When the transition surface of the limiting portion 1222 abuts against the second torsion arm 1246, the acting force applied by the second torsion arm 1246 to the transition surface is used to enable the lock 122 to generate a rotation moment, so that the lock 122 and the second torsion arm 1246 have a tendency to move away from each other. As shown in FIG. 10, when the lock 122 is a rod assembly, one end of the lock 122 is hinged to the upper cover 112. In addition, the limiting portion 1222 is disposed below the lock 122, and the barrier surface and the transition surface are disposed on a side of the limiting portion 1222 that is away from the hinge portion 1221. The transition surface is located below the barrier surface, and the transition surface has an angle of inclination (the angle of inclination of the transition surface may be the same as or different from that of the barrier surface in the foregoing embodiment). The angle of inclination may be properly set based on the location of the hinge portion 1221 of the lock 122.

As shown in FIG. 10, when the second torsion arm 1246 abuts against the transition surface with the angle of inclination, the second torsion arm 1246 applies an acting force $F_2$ to the barrier surface at an abutment location, and an extending direction of the acting force $F_2$ needs to be located above a connecting line between the abutment location and a hinge location (as shown in FIG. 10). In this case, the acting force $F_2$ generates a clockwise moment $M_2$ on the lock 122, so that the lock 122 generates a clockwise rotation tendency, to cause separation between the limiting portion 1222 and the second torsion arm 1246. In this way, the energy storage spring 124 can still smoothly release energy when the striking force is small. When $M_{F\ external}>M_{fresistance}+M_1+M_{F3}$, it can be ensured that the lock 122 rotates along a hinged end under an action of an external force, to drive the barrier surface to move relative to the second torsion arm 1246, so that the second torsion arm 1246 can slide to the transition surface. When $M_{F\ external}+M_2>M_{fdynamic}+M_{F3}$, and other friction forces of a system can be overcome, the lock 122 continues to move to an unlocking (energy release) location. $M_{F\ external}$ refers to an external force applied to the other end of the lock 122 relative to the hinged end, and may be the striking force of the release 134. When the second torsion arm 1246 abuts against the barrier surface, a friction force is $f_{resistance}$, which may be a dynamic friction force when the second torsion arm 1246 and the barrier surface move relative to each other, or may be a static friction force when the second torsion arm 1246 and the barrier surface are relatively stationary and have a tendency to move relative to each other. A moment generated corresponding to $f_{resistance}$ is $M_{f\ resistance}$. $M_{f\ dynamic}$ is a moment generated corresponding to the dynamic friction force $f_{dynamic}$ when the second torsion arm 1246 slides on the transition surface. $M_{F3}$ is a moment of an acting force $F_3$ applied by the first elastic member 126 to the lock 122. If a value of $M_2$ is set to $M_2>M_{f\ dynamic}+M_{F3}$, it is only necessary to ensure that the release 134 can drive the second torsion arm 1246 to slide to the transition surface, and then reliable release can be ensured. That is, provided that the striking force $F_{external}$ provided by the release 134 can drive the lock 122 to implement contact between the second torsion arm 1246 and the transition surface, reliable release can be ensured.

Figure 11:
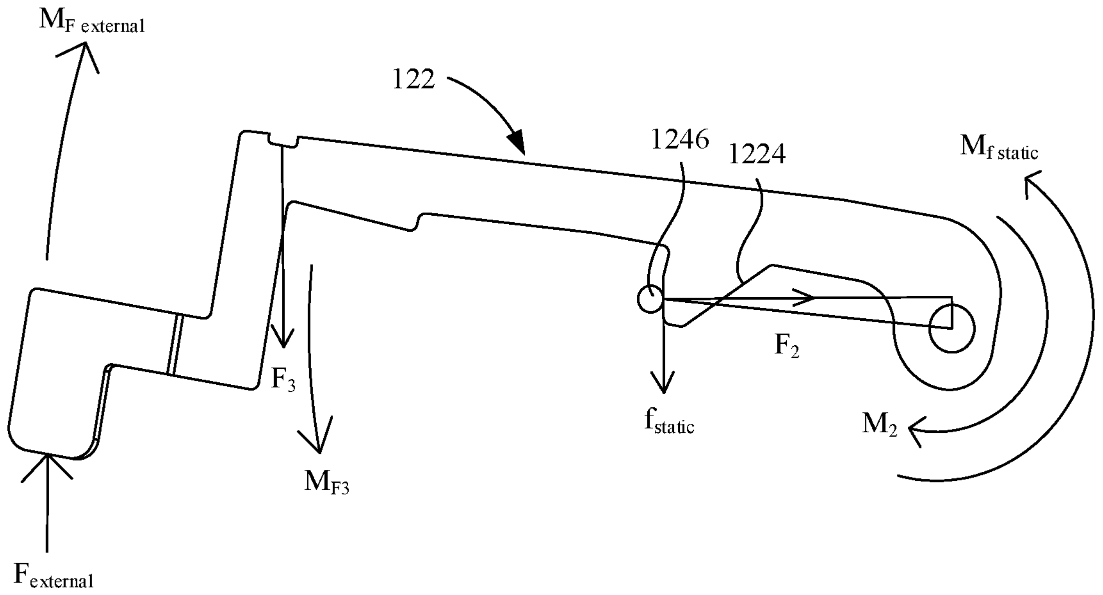
FIG. 11 is a third schematic diagram of forces on a lock according to an embodiment of the present disclosure.

In addition, as shown in FIG. 11, when the rotary switch 100 is subject to external vibration, the limiting portion 1222 gradually moves slowly from a locking location (the energy storage state of the energy storage spring 124) to an unlocking location (the energy release state of the energy storage spring 124) under an external vibration force. When the transition surface abuts against the second torsion arm 1246 of the energy storage spring 124, a friction force generated on the limiting portion 1222 is $f_{static}$($f_{static}=\mu_{static}\times F_2$, and $\mu_{static}$ is a static friction factor on the transition surface; $f_{dynamic\mu dynamic}\times F_2$, and $\mu_{dynamic}$ is a dynamic friction factor on the transition surface; $F_2$ is an acting force applied to the transition surface by the second torsion arm 1246 of the energy storage spring 124; and because $\mu_{static}$ is much greater than $\mu_{dynamic}$, $f_{static}$ is much greater than $f_{dynamic}$), and a generated moment is $M_{f\ static}$. When $M_2<M_{f\ static}$, it can still be ensured that the energy storage spring 124 remains in the energy storage state. When the first elastic member 126 is included, $M_2<M_{f\ static}+M_{F3}$, it can still be ensured that the energy storage spring 124 remains in the energy storage state. Therefore, disposing the transition surface can further improve an anti-interference capability of the rotary switch 100 in this application, that is, further increase an upper limit for a misoperation of the rotary switch 100 caused by vibration.

Figure 13:
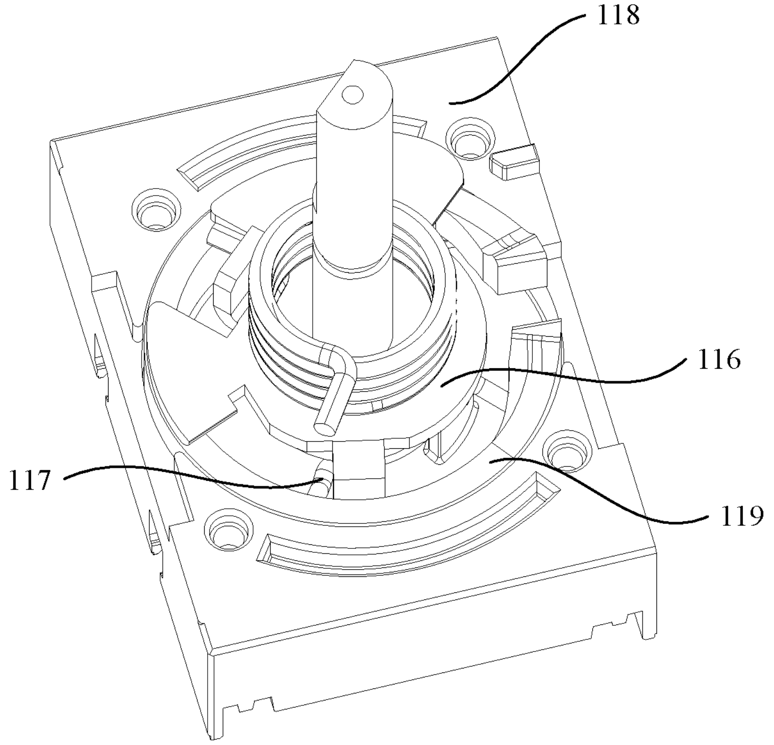
FIG. 13 is a schematic diagram of a structure of cooperation between a mounting base and a turntable according to an embodiment of the present disclosure.
Figure 14:
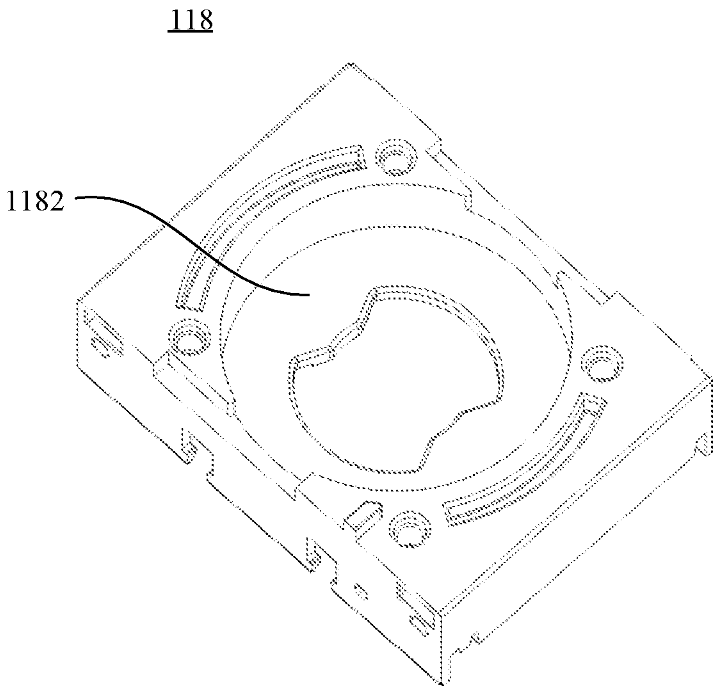
FIG. 14 is a schematic diagram of a structure of a mounting base according to an embodiment of the present disclosure.

As shown in FIG. 13 and FIG. 14, a mounting groove 1182 is disposed in the mounting base 118, and a turntable 119 is disposed in the mounting groove 1182. The turntable 119 is configured to connect the energy storage tray 116 to an on/off assembly 140 of the rotary switch 100, so that the energy storage tray 116 controls, by using the turntable 119, switch-off or switch-on of the rotary switch 100.

For example, the rotating shaft 114 is disposed by passing through the upper cover 112, and extends to a location of the mounting base 118. The energy storage tray 116 connected to the rotating shaft 114 is located in the location of the mounting base 118. When rotating, the rotating shaft 114 drives, by using the energy storage tray 116, the turntable 119 to rotate, to control switch-off or switch-on of the rotary switch 100. Because the turntable 119 rotates in the mounting groove 1182, an outer circle of the turntable 119 and an inner circle of the mounting groove 1182 are circular, so as to facilitate relative rotation.

Figure 15:
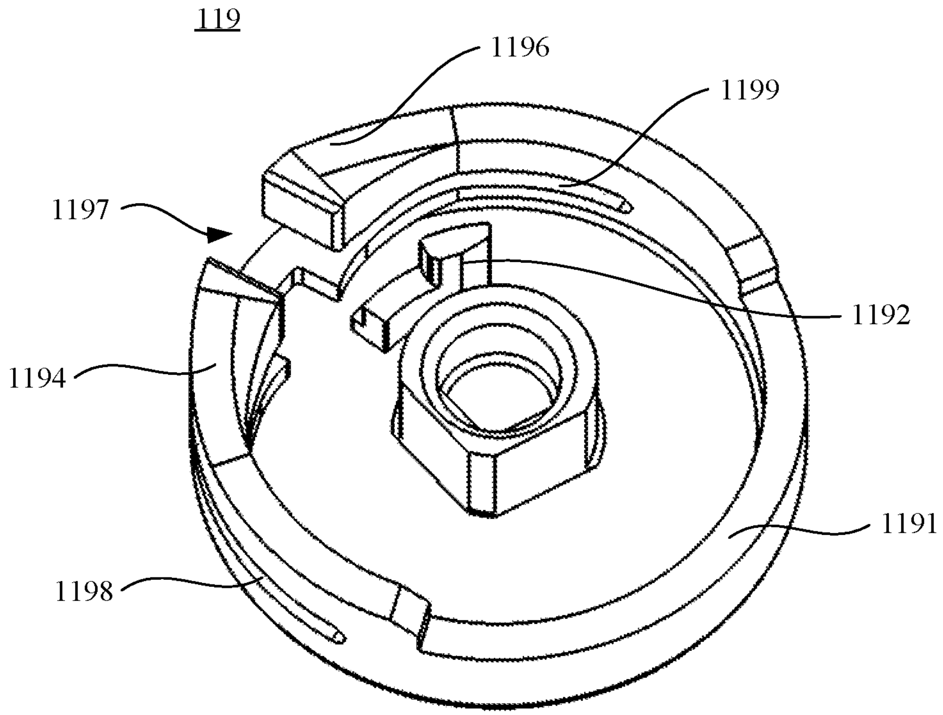
FIG. 15 is a first schematic diagram of a structure of a turntable according to an embodiment of the present disclosure.
Figure 17:
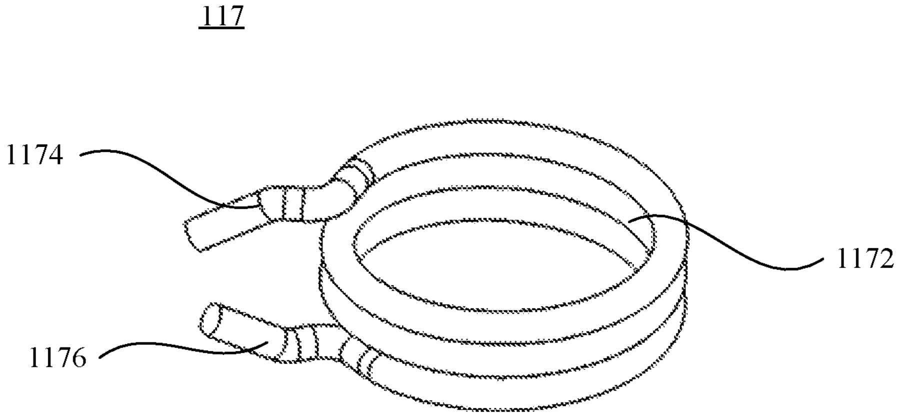
FIG. 17 is a schematic diagram of a structure of a second elastic member according to an embodiment of the present disclosure.

As shown in FIG. 4, FIG. 15, and FIG. 17, the energy storage tray 116 further includes a second protrusion 1166. The turntable 119 includes a stopper 1192. The stopper 1192 is located in a storage slot of the turntable 119. A second elastic member 117 is disposed in the storage slot, and the second elastic member 117 abuts against each of the second protrusion 1166 and the stopper 1192. When rotating, the energy storage tray 116 drives, by using the second elastic member 117, the turntable 119 to rotate, so that the rotary switch 100 is switched off or switched on.

For example, when rotating, the rotating shaft 114 drives, by using the energy storage tray 116, the second elastic member 117 to be elastically deformed, and an elastic force generated when the second elastic member 117 recovers from the elastic deformation causes the turntable 119 to rotate, so as to drive, by using the turntable 119, the rotary switch 100 to be switched off or switched on. It should be noted that the second elastic member 117 is not specifically limited in this application, provided that a required transmission force for switch—off or switch-on can be met. For example, the second elastic member 117 may be a torsion spring, a mainspring, or another elastic member. In a process in which the rotating shaft 114 rotates to enable the energy storage spring 124 to store energy and simultaneously drives the second elastic member 117 to be elastically deformed, the second elastic member 117 drives the turntable 119 to rotate, so that the rotary switch 100 is switched on. In addition, in an energy release process of the energy storage spring 124, the second elastic member 117 also recovers from elastic deformation to perform work, to drive the turntable 119 to rotate back and forth, so that the rotary switch 100 is switched off.

As shown in FIG. 4 and FIG. 14, a pushing portion 1168 is disposed on the energy storage tray 116, and the turntable 119 includes a turntable body 1191 and a first pawl 1194 and a second pawl 1196 that are disposed on the turntable body 1191. The first pawl 1194 and the second pawl 1196 are disposed opposite to each other, and there is a preset space 1197 between an end face of the first pawl 1194 and an end face of the second pawl 1196. Still referring to FIG. 6, a first limiting protrusion 1126 and a second limiting protrusion 1128 are disposed at a corresponding space on the upper cover 112, and both the first limiting protrusion 1126 and the second limiting protrusion 1128 can be clamped in the preset space 1197. There is a first gap 1198 between the first pawl 1194 and the turntable body 1191, and there is a second gap 1199 between the second pawl 1196 and the turntable body 1191. The sensing portion 1162 can abut against the first pawl 1194, so that the first pawl 1194 retracts toward the first gap 1198, and the first limiting protrusion 1126 releases limitation on the first pawl 1194. The pushing portion 1168 can abut against the second pawl 1196, so that the second pawl 1196 retracts toward the second gap 1199, and the second limiting protrusion 1128 releases limitation on the second pawl 1196.

Figure 18:
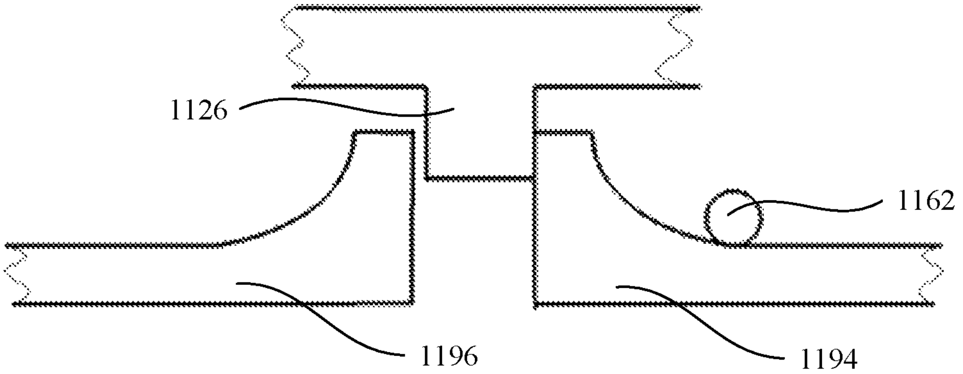
FIG. 18 is a first schematic diagram of a structure of cooperation between a turntable and an upper cover according to an embodiment of the present disclosure.
Figure 19:
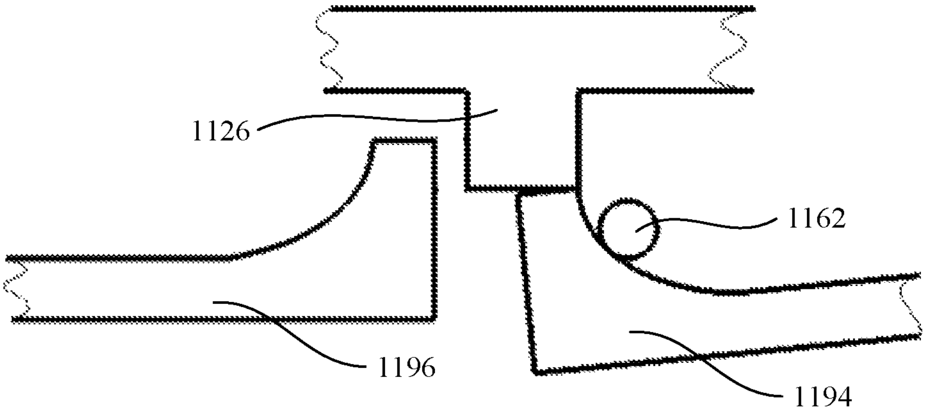
FIG. 19 is a second schematic diagram of a structure of cooperation between a turntable and an upper cover according to an embodiment of the present disclosure.

For example, in a process in which the rotating shaft 114 is manually operated to rotate, to enable the energy storage spring 124 to store energy and drive the rotary switch 100 to be switched on, the energy storage tray 116 synchronously rotates along with the rotating shaft 114. At an initial moment at which the energy storage tray 116 rotates, the sensing portion 1162 moves toward the first pawl 1194. As the rotation continues, the sensing portion 1162 abuts against the first pawl 1194 (as shown in FIG. 18), and continues to push forward, until the sensing portion 1162 presses against the first pawl 1194 to deform in a direction toward the first gap 1198. In a process in which the first pawl 1194 is pressed against by the sensing portion 1162 and deformed, the end face of the first pawl 1194 and the first limiting protrusion 1126 are staggered (as shown in FIG. 19), so that the turntable 119 can continuously rotate, to implement a purpose of switching on the rotary switch 100. When the rotary switch 100 completes switch-on, the preset space 1197 between the end face of the first pawl 1194 and the end face of the second pawl 1196 corresponds to the second limiting protrusion 1128, so that the turntable 119 is limited and an accidental action of the rotary switch 100 is prevented. This helps ensure state stability of the rotary switch 100.

Similarly, in a process of remotely controlling switch-off, the release 134 acts to enable the lock 122 to release limitation on the energy storage spring 124. The elastic potential energy accumulated by the energy storage spring 124 is released in a switch-of process, to drive the rotating shaft 114 to rotate back and forth. The energy storage tray 116 synchronously rotates along with the rotating shaft 114, and the pushing portion 1168 moves toward the second pawl 1196. As the rotation continues, the pushing portion 1168 abuts against the second pawl 1196 and continues to push forward, until the pushing portion 1168 presses against the second pawl 1196 and the second pawl 1196 deforms in a direction toward the second gap 1199. In a process in which the second pawl 1196 is pressed against by the pushing portion 1168 and deformed, the end face of the second pawl 1196 and the second limiting protrusion 1128 are staggered, so that the turntable 119 can continuously rotate, to implement a purpose of switching off the rotary switch 100. When the rotary switch 100 completes switch-off, the preset space 1197 between the end face of the first pawl 1194 and the end face of the second pawl 1196 corresponds to the first limiting protrusion 1126, so that rotation of the turntable 119 can be driven by only the operation mechanism 110, and an accidental action of the rotary switch 100 is prevented. This helps ensure state stability of the rotary switch 100.

It should be noted that, while pushing the first pawl 1194 to enable the first pawl 1194 to be deformed, the sensing portion 1162 can also cooperate with the sensing component 132 to enable the sensing component 132 to output the sensing signal. During rotation, the sensing portion 1162 has a larger radius than the pushing portion 1168, so that the sensing portion 1162 can cooperate with the sensing component 132, and other parts do not interfere with the sensing component 132.

As shown in FIG. 4, FIG. 15, and FIG. 17, in an optional embodiment, the second elastic member 117 includes an elastic body 1172 and a first end 1174 and a second end 1176 that are connected to the elastic body 1172. The first end 1174 abuts against the second protrusion 1166, and the second end 1176 abuts against the stopper 1192.

For example, in a process in which the rotating shaft 114 is manually operated to rotate, the energy storage tray 116 rotates, so that the second elastic member 117 is elastically deformed. As the rotation continues, the sensing portion 1162 abuts against the first pawl 1194 and continues to push forward, and an elastic deformation amount continues to increase, until the sensing portion 1162 presses against the first pawl 1194 to deform in the direction toward the first gap 1198, so that the first pawl 1194 goes beyond the first limiting protrusion 1126. After the first pawl 1194 goes beyond the first limiting protrusion 1126, the first limiting protrusion 1126 no longer plays a role of limiting the turntable 119, and the second elastic member 117 drives, by using the stopper 1192, the turntable 119 to switch on the rotary switch 100. Similarly, in a process of remotely controlling switch-off, the elastic potential energy accumulated by the energy storage spring 124 is released, to drive the rotating shaft 114 to rotate back and forth. The energy storage tray 116 synchronously rotates along with the rotating shaft 114, and the pushing portion 1168 abuts against the second pawl 1196 and continues to push forward, until the pushing portion 1168 presses against the second pawl 1196 and the second pawl 1196 deforms in the direction toward the second gap 1199. In a process in which the second pawl 1196 is pressed against by the pushing portion 1168 and deformed, the end face of the second pawl 1196 and the second limiting protrusion 1128 are staggered, so that the second elastic member 117 drives, by using the stopper 1192, the turntable 119 to rotate back and forth, to implement a purpose of switching off the rotary switch 100.

Figure 20:
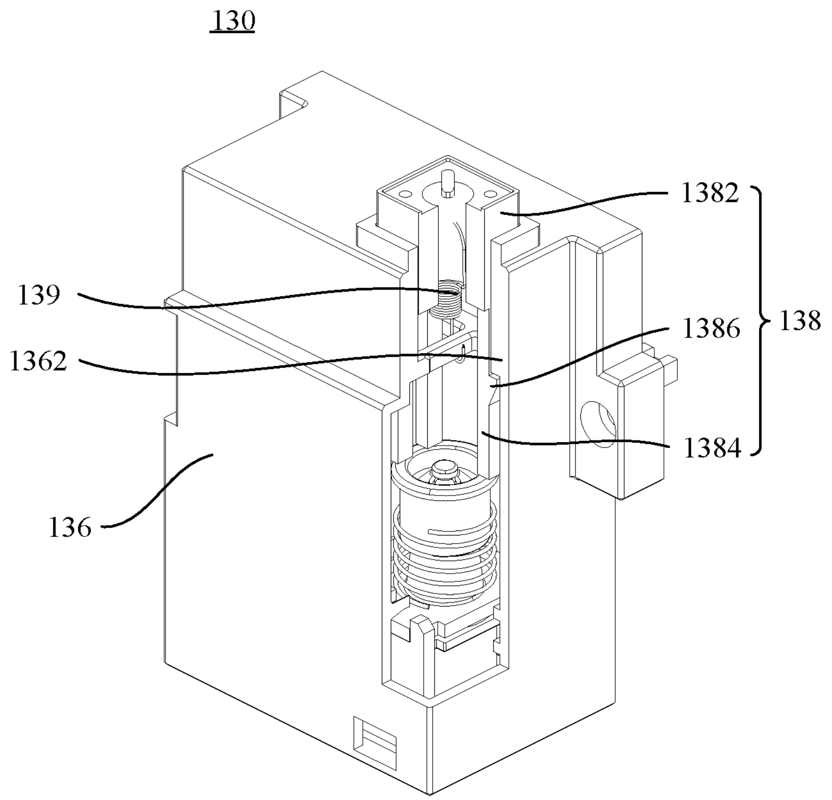
FIG. 20 is a schematic diagram of a structure of a release assembly according to an embodiment of the present disclosure.

As shown in FIG. 20, the release assembly 130 further includes a housing 136 and a reset button 138 disposed on the housing 136. The reset button 138 includes a pressing portion 1382 and a support portion 1384 connected to the pressing portion 1382. A clamping portion 1386 is disposed on the support portion 1384, and is configured to be clamped to a blocker 1362 in the housing 136 for limitation. The support portion 1384 is configured to abut against the release 134, so that the release 134 is reset after action.

For example, after the release 134 strikes the release portion 1223, the release 134 needs to be reset by using an external force. By pressing against the pressing portion 1382 of the reset button 138, the support portion 1384 applies a force to reset the release 134. By using the clamping portion 1386 disposed on the support portion 1384 and the blocker 1362 disposed in the housing 136, the reset button 138 can be limited, to avoid a loss of the reset button 138. This helps ensure connection stability.

Still referring to FIG. 20, an elastic reset member 139 is disposed between the pressing portion 1382 and the housing 136, so that the reset button 138 has a tendency to move toward the release 134. In this way, a location of the reset button 138 can be relatively fixed, thereby avoiding random shaking between the reset button 138 and the housing 136.

Figure 21:
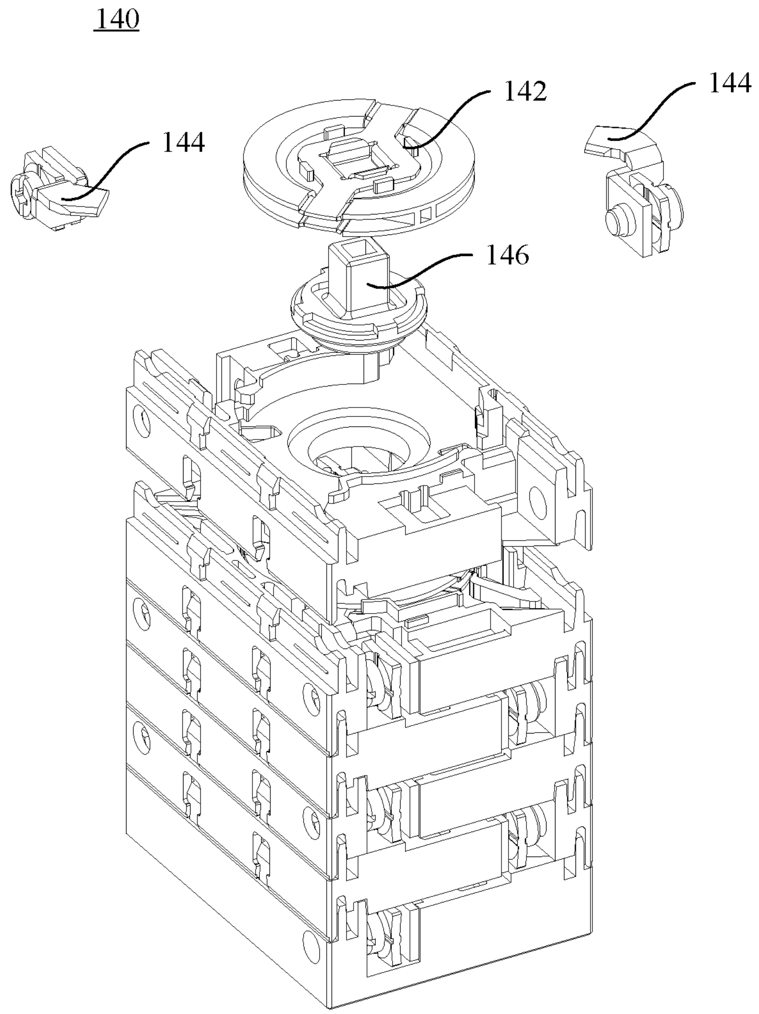
FIG. 21 is a schematic diagram of a structure of an on/off assembly according to an embodiment of the present disclosure.

As shown in FIG. 1 and FIG. 21, the rotary switch 100 provided in this embodiment of the present disclosure further includes the on/off assembly 140 connected to the operation mechanism 110 in the energy storage status monitoring structure. The on/off assembly 140 includes a static contact component 144 and a dynamic contact component 142 that is connected to the energy storage tray 116 of the operation mechanism 110 by transmission.

Figure 16:
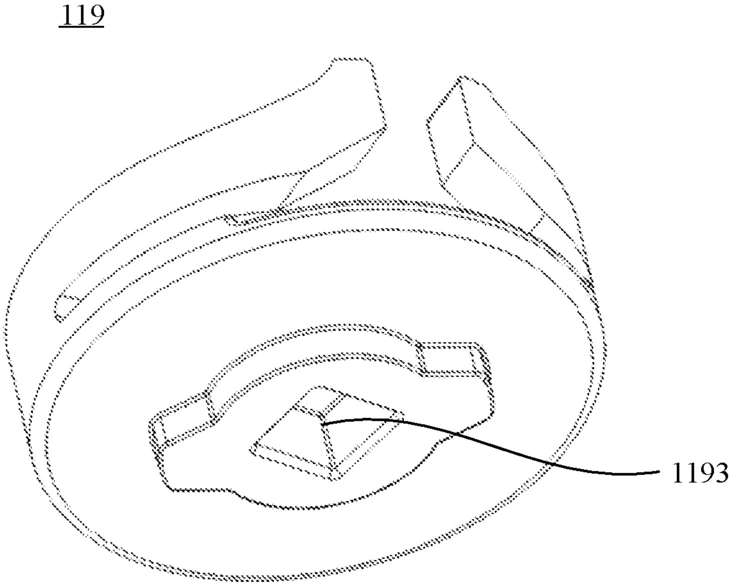
FIG. 16 is a second schematic diagram of a structure of a turntable according to an embodiment of the present disclosure.

For example, the dynamic contact component 142 is connected to the turntable 119 by using a coupler 146, and the turntable 119 is connected to the energy storage tray 116 by using the second elastic member 117, so that the energy storage tray 116 drives the dynamic contact component 142 to reach contact with or be separated from the static contact component 144. As shown in FIG. 14, a connecting hole 1193 (shown in FIG. 16) is correspondingly disposed on the turntable 119, so that the coupler 146 is connected to the turntable 119, and the dynamic contact component 142 is also connected to the coupler 146. Therefore, the dynamic contact component 142 synchronously rotates with the turntable 119. A connected conductor is disposed on the dynamic contact component 142. There are two static contact components 144. A conductor is also disposed on each static contact component 144. By rotating the dynamic contact component 142, the conductor on the dynamic contact component 142 is separately connected to the conductors on the two static contacts, to form a path. When the dynamic contact rotates to another location, the conductors on the two static contact components 144 are disconnected, to form an open circuit, thereby implementing switch-on or switch-off of the rotary switch 100.

The foregoing are merely preferred examples of the present disclosure and are not intended to limit the present disclosure, and various changes and modifications may be made to the present disclosure by a person skilled in the art. Any modification, equivalent replacement, or improvement made without departing from the principle of the present disclosure shall fall within the protection scope of the present disclosure.

What is claimed is:

1. An energy storage status monitoring structure, comprising an operation mechanism, an energy storage assembly, and a release assembly, wherein the operation mechanism comprises an upper cover, a rotating shaft rotatably connected to the upper cover, and an energy storage tray connected to the rotating shaft, the energy storage assembly is connected to the energy storage tray, a sensing portion is disposed on the energy storage tray, a sensing component is disposed on the release assembly, and based on the energy storage tray rotating to enable the energy storage assembly to store energy, the sensing portion corresponds to the sensing component, whereby the sensing component outputs a corresponding sensing signal, wherein the energy storage assembly comprises a lock, and an energy storage spring clamped to the energy storage tray and the upper cover, and rotating the energy storage tray enables the energy storage spring to store energy and be clamped to the lock.

2. The energy storage status monitoring structure according to claim 1, wherein the sensing component is any one of a micro switch, a travel switch, or a proximity switch.

3. The energy storage status monitoring structure according to claim 1, wherein the energy storage tray further comprises a first protrusion, the energy storage spring comprises an energy storage body, and a first torsion arm and a second torsion arm connected to the energy storage body, wherein the first torsion arm is clamped to the upper cover, and the second torsion arm abuts against the first protrusion.

4. The energy storage status monitoring structure according to claim 3, wherein the release assembly further comprises a release, and the lock comprises a hinge portion hinged to the upper cover, a limiting portion configured to limit the second torsion arm, and a release portion cooperating with the release.

5. The energy storage status monitoring structure according to claim 4, wherein a first elastic member is further disposed on the lock, the operation mechanism further comprises a mounting base connected to the upper cover, and the first elastic member is disposed between the lock and the upper cover, or the first elastic member is disposed between the lock and the mounting base, whereby the release portion has a tendency to move toward the release.

6. The energy storage status monitoring structure according to claim 5, wherein a mounting groove is disposed in the mounting base, a turntable is disposed in the mounting groove, and the turntable is configured to connect the energy storage tray to an on/off assembly of the rotary switch, so that the energy storage tray controls, using the turntable, switch-off or switch-on of the rotary switch.

7. The energy storage status monitoring structure according to claim 6, wherein the energy storage tray further comprises a second protrusion, the turntable comprises a stopper, the stopper is located in a storage slot of the turntable, a second elastic member is disposed in the storage slot, the second elastic member abuts against each of the second protrusion and the stopper, and when rotating, the energy storage tray drives, using the second elastic member, the turntable to rotate, to enable the rotary switch to be switched off or switched on.

8. The energy storage status monitoring structure according to claim 4, wherein the release assembly further comprises a housing and a reset button disposed on the housing, the reset button comprises a pressing portion and a support portion connected to the pressing portion, a clamping portion is disposed on the support portion, and is configured to be clamped to a blocker in the housing for limiting, and the support portion is configured to abut against the release, whereby the release is reset after acting.

9. The energy storage status monitoring structure according to claim 8, wherein an elastic reset member is disposed between the pressing portion and the housing, so that the reset button has a tendency to move toward the release.

10. A rotary switch, comprising an energy storage status monitoring structure and an on/off assembly connected to an operation mechanism in the energy storage status monitoring structure, wherein the on/off assembly comprises a static contact component and a dynamic contact component that is connected to an energy storage tray of the operation mechanism through transmission; wherein the energy storage status monitoring structure comprises an operation mechanism, an energy storage assembly, and a release assembly, wherein the operation mechanism comprises an upper cover, a rotating shaft rotatably connected to the upper cover, and an energy storage tray connected to the rotating shaft, the energy storage assembly is connected to the energy storage tray, a sensing portion is disposed on the energy storage tray, a sensing component is disposed on the release assembly, and based on the energy storage tray rotating to enable the energy storage assembly to store energy, the sensing portion corresponds to the sensing component, whereby the sensing component outputs a corresponding sensing signal, wherein the energy storage assembly comprises a lock, and an energy storage spring clamped to the energy storage tray and the upper cover, and rotating the energy storage tray enables the energy storage spring to store energy and be clamped to the lock.

11. The rotary switch according to claim 10, wherein the sensing component is any one of a micro switch, a travel switch, or a proximity switch.

12. The rotary switch according to claim 10, wherein the energy storage tray further comprises a first protrusion, the energy storage spring comprises an energy storage body, and a first torsion arm and a second torsion arm connected to the energy storage body, wherein the first torsion arm is clamped to the upper cover, and the second torsion arm abuts against the first protrusion.

13. The rotary switch according to claim 12, wherein the release assembly further comprises a release, and the lock comprises a hinge portion hinged to the upper cover, a limiting portion configured to limit the second torsion arm, and a release portion cooperating with the release.

14. The rotary switch according to claim 13, wherein a first elastic member is further disposed on the lock, the operation mechanism further comprises a mounting base connected to the upper cover, and the first elastic member is disposed between the lock and the upper cover, or the first elastic member is disposed between the lock and the mounting base, whereby the release portion has a tendency to move toward the release.

15. The rotary switch according to claim 14, wherein a mounting groove is disposed in the mounting base, a turntable is disposed in the mounting groove, and the turntable is configured to connect the energy storage tray to an on/off assembly of the rotary switch, so that the energy storage tray controls, using the turntable, switch-off or switch-on of the rotary switch.

16. The rotary switch according to claim 15, wherein the energy storage tray further comprises a second protrusion, the turntable comprises a stopper, the stopper is located in a storage slot of the turntable, a second elastic member is disposed in the storage slot, the second elastic member abuts against each of the second protrusion and the stopper, and when rotating, the energy storage tray drives, using the second elastic member, the turntable to rotate, to enable the rotary switch to be switched off or switched on.

17. The rotary switch according to claim 13, wherein the release assembly further comprises a housing and a reset button disposed on the housing, the reset button comprises a pressing portion and a support portion connected to the pressing portion, a clamping portion is disposed on the support portion, and is configured to be clamped to a blocker in the housing for limiting, and the support portion is configured to abut against the release, whereby the release is reset after acting.

18. The rotary switch according to claim 17, wherein an elastic reset member is disposed between the pressing portion and the housing, so that the reset button has a tendency to move toward the release.

* * * * *